(12) United States Patent
Derginer et al.

(10) Patent No.: US 11,804,137 B1
(45) Date of Patent: Oct. 31, 2023

(54) MARINE PROPULSION CONTROL SYSTEM AND METHOD WITH COLLISION AVOIDANCE OVERRIDE

(71) Applicant: Brunswick Corporation, Mettawa, IL (US)

(72) Inventors: Matthew E. Derginer, Butte des Morts, WI (US); Aaron J. Ward, Oshkosh, WI (US); Travis C. Malouf, Germantown, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/750,624

(22) Filed: May 23, 2022

Related U.S. Application Data

(63) Continuation of application No. 16/694,581, filed on Nov. 25, 2019, now Pat. No. 11,373,537.

(Continued)

(51) Int. Cl.
  *G08G 3/02* (2006.01)
  *G05D 1/02* (2020.01)
  (Continued)

(52) U.S. Cl.
  CPC ............... *G08G 3/02* (2013.01); *B63B 43/18* (2013.01); *B63B 79/40* (2020.01); *B63H 25/42* (2013.01); *B63H 25/46* (2013.01); *G05D 1/0206* (2013.01)

(58) Field of Classification Search
  CPC . G08G 3/00; G08G 3/02; B63B 79/40; B63B 43/00; B63B 43/18; B63H 25/00;
  (Continued)

(56) References Cited

U.S. PATENT DOCUMENTS

| 5,515,287 A | 5/1996 | Hakoyama et al. |
| 6,234,100 B1 | 5/2001 | Fadeley et al. |

(Continued)

FOREIGN PATENT DOCUMENTS

| CA | 2279165 | 1/2001 |
| CA | 2282064 | 1/2001 |

(Continued)

OTHER PUBLICATIONS

W. Xu et al., "Internet of Vehicles in Big Data Era." in IEEE/CAA Journal of Automatica Sinica, vol. 5, No. 1, pp. 19-35, Jan. 2018, doi:10.1109/JAS.2017.7510736. (Year 2018).

(Continued)

*Primary Examiner* — Lars A Olson
(74) *Attorney, Agent, or Firm* — ANDRUS INTELLECTUAL PROPERTY LAW, LLP

(57) ABSTRACT

A method of controlling propulsion of a marine vessel includes limiting user input authority over propulsion output by at least one propulsion device based on proximity measurements so as to maintain the marine vessel at least a buffer distance from any object, where in the buffer distance is a predefined distance around the marine vessel. After a user-generated instruction is received to suspend maintenance of the buffer distance and a user control input is received to move the marine vessel in the direction of the object, the at least one propulsion device is controlled based on the user control input such that the marine vessel approaches and impacts the object.

23 Claims, 9 Drawing Sheets

Related U.S. Application Data

(60) Provisional application No. 62/783,408, filed on Dec. 21, 2018.

(51) Int. Cl.
*B63B 79/40* (2020.01)
*B63H 25/42* (2006.01)
*B63B 43/18* (2006.01)
*B63H 25/46* (2006.01)

(58) Field of Classification Search
CPC .......... B63H 25/42; B63H 25/46; G05D 1/02; G05D 1/0206
USPC ............................................................ 440/1
See application file for complete search history.

(56) References Cited

U.S. PATENT DOCUMENTS

| | | |
|---|---|---|
| 6,273,771 B1 | 8/2001 | Buckley et al. |
| 6,677,889 B2 | 1/2004 | Van Rees et al. |
| 7,267,068 B2 | 11/2007 | Bradley et al. |
| 7,725,253 B2 | 5/2010 | Foxlin |
| 8,195,381 B2 | 6/2012 | Arvidsson |
| 8,622,778 B2 | 1/2014 | Tyers et al. |
| 9,039,469 B1 | 5/2015 | Calamia et al. |
| 9,183,711 B2 | 11/2015 | Fiorini et al. |
| 9,355,463 B1 | 5/2016 | Arambel et al. |
| 9,615,006 B2 | 4/2017 | Terre et al. |
| 9,650,119 B2 | 5/2017 | Morikami et al. |
| 9,729,802 B2 | 8/2017 | Frank et al. |
| 9,734,583 B2 | 8/2017 | Walker et al. |
| 9,778,657 B2 | 10/2017 | Tyers |
| 9,878,769 B2 | 1/2018 | Kinoshita et al. |
| 9,996,083 B2 | 1/2018 | Vojak |
| 9,908,605 B2 | 3/2018 | Hayashi et al. |
| 9,927,520 B1 | 3/2018 | Ward et al. |
| 9,988,134 B1 | 6/2018 | Gable et al. |
| 10,037,701 B2 | 7/2018 | Harnett |
| 10,048,690 B1 | 8/2018 | Hilbert et al. |
| 10,055,648 B1 | 8/2018 | Grigsby et al. |
| 10,106,238 B2 | 10/2018 | Sidki et al. |
| 10,126,748 B2 | 11/2018 | Akuzawa et al. |
| 10,191,153 B2 | 1/2019 | Gatland |
| 10,191,490 B2 | 1/2019 | Akuzawa et al. |
| 10,272,977 B2 | 4/2019 | Hashizume et al. |
| 10,281,917 B2 | 5/2019 | Tyers |
| 10,338,800 B2 | 7/2019 | Rivers et al. |
| 10,429,845 B2 | 10/2019 | Arbuckle et al. |
| 10,431,099 B2 | 10/2019 | Stewart et al. |
| 10,444,349 B2 | 10/2019 | Gatland |
| 10,507,899 B2 | 12/2019 | Imamura et al. |
| 10,746,552 B2 | 8/2020 | Hashizume et al. |
| 11,373,537 B2 * | 6/2022 | Derginer ................. B63B 79/40 |
| 2003/0137445 A1 | 7/2003 | Van Rees et al. |
| 2005/0075016 A1 | 4/2005 | Bertetti et al. |
| 2006/0058929 A1 | 3/2006 | Fossen et al. |
| 2007/0089660 A1 | 4/2007 | Bradley et al. |
| 2011/0153125 A1 | 6/2011 | Arbuckle et al. |
| 2011/0172858 A1 | 7/2011 | Gustin et al. |
| 2014/0316657 A1 | 10/2014 | Johnson et al. |
| 2015/0009325 A1 | 1/2015 | Kardashov |
| 2015/0032305 A1 | 1/2015 | Lindeborg |
| 2015/0089427 A1 | 3/2015 | Akuzawa |
| 2015/0134146 A1 | 5/2015 | Pack et al. |
| 2015/0172545 A1 | 6/2015 | Szabo et al. |
| 2015/0276923 A1 | 10/2015 | Song et al. |
| 2015/0288891 A1 | 10/2015 | Johansson et al. |
| 2015/0294660 A1 | 10/2015 | Stokes et al. |
| 2015/0375837 A1 | 12/2015 | Johnson et al. |
| 2015/0378361 A1 | 12/2015 | Walker et al. |
| 2016/0041039 A1 | 2/2016 | Olsson |
| 2016/0069681 A1 | 3/2016 | Johnson et al. |
| 2016/0070265 A1 | 3/2016 | Liu et al. |
| 2016/0125739 A1 | 5/2016 | Stewart et al. |
| 2016/0162145 A1 | 6/2016 | Rivers et al. |
| 2016/0187140 A1 | 6/2016 | Clarke et al. |
| 2016/0196653 A1 | 7/2016 | Grant et al. |
| 2016/0214534 A1 | 7/2016 | Richards et al. |
| 2016/0334794 A1 | 7/2016 | Johnson et al. |
| 2016/0370187 A1 | 12/2016 | Gatland et al. |
| 2017/0052029 A1 | 2/2017 | Ninomiya et al. |
| 2017/0059705 A1 | 3/2017 | Stokes et al. |
| 2017/0064238 A1 | 3/2017 | Kardashov |
| 2017/0090021 A1 | 3/2017 | Sayer et al. |
| 2017/0146642 A1 | 5/2017 | Stokes et al. |
| 2017/0167871 A1 | 6/2017 | Johnson et al. |
| 2017/0168159 A1 | 6/2017 | Gatland |
| 2017/0176586 A1 | 6/2017 | Johnson et al. |
| 2017/0184414 A1 | 6/2017 | Johsnon et al. |
| 2017/0205829 A1 | 7/2017 | Tyers |
| 2017/0227639 A1 | 8/2017 | Stokes et al. |
| 2017/0243360 A1 | 8/2017 | Schulte |
| 2017/0253314 A1 | 9/2017 | Ward |
| 2017/0277189 A1 | 9/2017 | Johnson et al. |
| 2017/0285134 A1 | 10/2017 | Stokes et al. |
| 2017/0300056 A1 | 10/2017 | Johnson et al. |
| 2017/0365175 A1 | 12/2017 | Harnett |
| 2017/0371348 A1 | 12/2017 | Mou |
| 2018/0023954 A1 | 1/2018 | Rivers |
| 2018/0050772 A1 | 2/2018 | Koyano et al. |
| 2018/0057132 A1 | 3/2018 | Ward et al. |
| 2018/0081054 A1 | 3/2018 | Rudzinsky et al. |
| 2018/0259338 A1 | 9/2018 | Stokes et al. |
| 2018/0259339 A1 | 9/2018 | Johnson et al. |
| 2018/0292529 A1 | 10/2018 | Hogasten |
| 2019/0098212 A1 | 3/2019 | Shain et al. |
| 2019/0137618 A1 | 5/2019 | Hawker |
| 2019/0251356 A1 | 8/2019 | Rivers |
| 2019/0258258 A1 | 8/2019 | Tyers |
| 2019/0283855 A1 | 9/2019 | Nilsson |
| 2019/0299983 A1 | 10/2019 | Shalev-Shwartz et al. |

FOREIGN PATENT DOCUMENTS

| | | |
|---|---|---|
| CN | 110325823 | 10/2019 |
| DE | 11 2013 004908 | 6/2015 |
| EP | 1 775 212 | 4/2007 |
| EP | 1873052 | 1/2008 |
| EP | 3 182 155 | 6/2017 |
| EP | 2824528 | 3/2019 |
| JP | 7-246998 | 10/1999 |
| JP | 2016049903 | 4/2016 |
| JP | 2017178242 | 10/2017 |
| KR | 20140011245 | 1/2014 |
| WO | WO 9305406 | 3/1993 |
| WO | WO 2006040785 | 4/2006 |
| WO | WO 2006 062416 | 6/2006 |
| WO | WO 2008 066422 | 6/2008 |
| WO | WO 2012010818 | 1/2012 |
| WO | WO 2017 095235 | 6/2017 |
| WO | 2017168234 | 10/2017 |
| WO | WO 2017167905 | 10/2017 |
| WO | WO 2017168234 | 10/2017 |
| WO | 2017205829 | 11/2017 |
| WO | WO 2018162933 | 9/2018 |
| WO | WO 2018172849 | 9/2018 |
| WO | WO 2018201097 | 11/2018 |
| WO | 2018232377 | 12/2018 |
| WO | WO 2018232376 | 12/2018 |
| WO | WO 2018232377 | 12/2018 |
| WO | WO 2019011451 | 1/2019 |
| WO | WO 2019096401 | 5/2019 |
| WO | WO 2019126755 | 6/2019 |
| WO | WO 2019157400 | 8/2019 |
| WO | WO 2019180506 | 9/2019 |
| WO | WO 2019201945 | 10/2019 |

OTHER PUBLICATIONS

An Autonomous Solar-Powered Marine Robitic Ibservatory for Permanent Monitoring of Large Areas of Shallow Water by I.

(56) References Cited

OTHER PUBLICATIONS

Gonzalez-Reolid et al.; Sensors 2018, 18(10), 3497; https://doi.org/10.3390/s18103497 (Year 2018).
S. Reed and V.E Schmidt, "Providing Nautical Chart Awareness to Autonomous Surface Vessel operations," Oceans 2016 MTS/IEEE Monterery, 2016, pp. 1-8, doi: 10.1109/OCEANS.2016.7761472 (Year 2016).
John Bayless, Adaptive Control of Joystick Steering in Recreational Boats, Marquette University, Aug. 2017, https://epublications.marquette.edu/cgi/viewcontent.cgi?article=1439&context=theses_open.
European search report dated Apr. 24, 2020 in counterpart European Patent Application 192172244.3.

* cited by examiner

MARINE PROPULSION CONTROL SYSTEM AND METHOD WITH COLLISION AVOIDANCE OVERRIDE

CROSS REFERENCE TO RELATED APPLICATION

This application is a continuation of U.S. patent application Ser. No. 16/694,581, filed Nov. 25, 2019, which application claims priority to U.S. Provisional Patent Application No. 62/783,408, filed Dec. 21, 2018. All of which applications are incorporated herein by reference in their entirety.

FIELD

The present disclosure generally relates to propulsion control systems and methods for controlling propulsion of a marine vessel, and more specifically to propulsion control systems and methods that limit the velocity of the marine vessel in a direction of an object based on the proximity of that object.

BACKGROUND

The following U.S. Patents are incorporated herein by reference, in entirety:

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,267,068 discloses a marine vessel that is maneuvered by independently rotating first and second marine propulsion devices about their respective steering axes in response to commands received from a manually operable control device, such as a joystick. The marine propulsion devices are aligned with their thrust vectors intersecting at a point on a centerline of the marine vessel and, when no rotational movement is commanded, at the center of gravity of the marine vessel. Internal combustion engines are provided to drive the marine propulsion devices. The steering axes of the two marine propulsion devices are generally vertical and parallel to each other. The two steering axes extend through a bottom surface of the hull of the marine vessel.

U.S. Pat. No. 9,927,520 discloses a method of detecting a collision of the marine vessel, including sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Patent Application Publication No. 2017/0253314 discloses a system for maintaining a marine vessel in a body of water at a selected position and orientation, including a global positioning system that determines a global position and heading of the vessel and a proximity sensor that determines a relative position and bearing of the vessel with respect to an object near the vessel. A controller operable in a station-keeping mode is in signal communication with the GPS and the proximity sensor. The controller chooses between using global position and heading data from the GPS and relative position and bearing data from the proximity sensor to determine if the vessel has moved from the selected position and orientation. The controller calculates thrust commands required to return the vessel to the selected position and orientation and outputs the thrust commands to a marine propulsion system, which uses the thrust commands to reposition the vessel.

U.S. Patent Application Publication No. 2018/0057132 discloses a method for controlling movement of a marine vessel near an object, including accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a marine vessel is powered by a marine propulsion system and movable with respect to first, second, and third axes that are perpendicular to one another and define at least six degrees of freedom of potential vessel movement. A method for controlling a position of the marine vessel near a target location includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a method of controlling propulsion of a marine vessel includes receiving proximity measurements from one or more proximity sensors on the marine vessel and limiting user input authority over propulsion output in a direction of an object by at least one propulsion device based on the proximity measurement so as to maintain the marine vessel at least a buffer distance from the object. The method further includes suspending maintenance of the buffer distance from the object in response to a user-generated instruction. Then, when user control input is receive via a user input device to move the marine vessel in the direction of the object, the at least one propulsion device is controlled based on the user control input such that the marine vessel approaches and impacts the object.

One embodiment of a propulsion control system on a marine vessel includes at least one propulsion device configured to propel the marine vessel, at least one input device manipulatable to provide user control input to control a movement direction and velocity of the marine vessel, at least one proximity sensor system configured to generate proximity measurements describing a proximity of an object with respect to the marine vessel, and a controller. The controller is configured to limit user input authority over propulsion output in a direction of the object by at least one propulsion device based on the proximity measurement so as to maintain the marine vessel at least a buffer distance from the object, and then to suspend the maintenance of the buffer distance from the object upon receipt of a user-generated instruction to do so. Upon receipt of a user control input via the user input device to move the marine vessel in the direction of the object, the controller controls the at least one propulsion device based on the user control input such that the marine vessel approaches and impacts the object. In certain embodiments, the controller is configured to limit the user input authority over propulsion output in the direction of the object as the marine vessel approaches and impacts the object, wherein limiting the user input authority in the direction of the object includes imposing a velocity limit in the direction of the object based on the proximity measurement and the buffer distance value.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
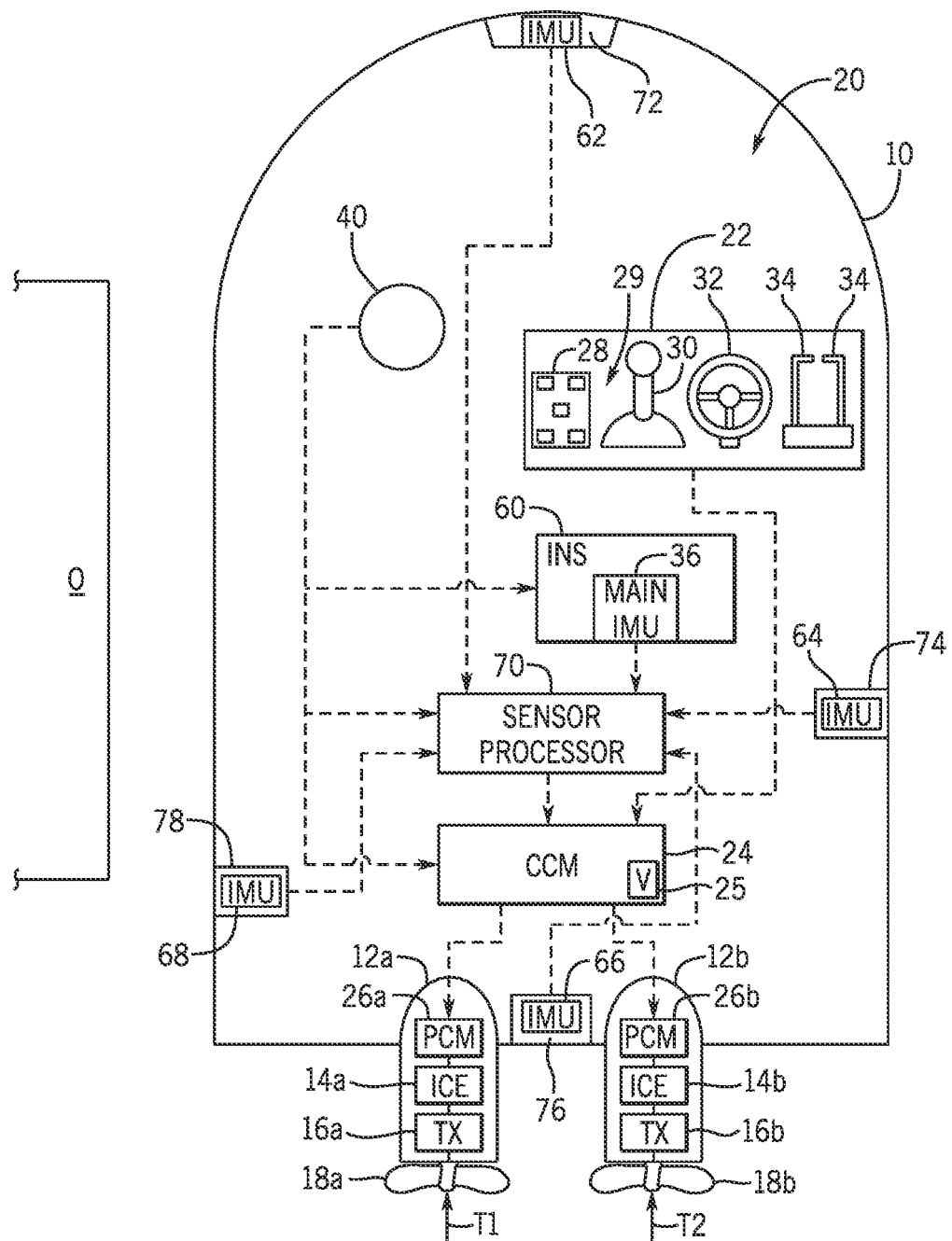
FIG. 1 is a schematic representation of an exemplary propulsion system on a marine vessel.

FIG. 1 shows a marine vessel 10 equipped with a propulsion control system 20 on a marine vessel 10 configured according to one embodiment of the disclosure. The propulsion control system 20 is capable of operating, for example, in a joysticking mode where a joystick is operated by an operator to control vessel movement within an x/y plane, among other modes, as described hereinbelow. The propulsion system 20 has first and second propulsion devices 12a, 12b that produce first and second thrusts T1, T2 to propel the vessel 10. The first and second propulsion devices 12a, 12b are illustrated as outboard motors, but they could alternatively be inboard motors, stern drives, jet drives, or pod drives. Each propulsion device is provided with an engine 14a, 14b operatively connected to a transmission 16a, 16b, in turn, operatively connected to a propeller 18a, 18b.

The vessel 10 also houses various control elements that comprise part of the propulsion control system 20. The system 20 comprises an operation console 22 in signal communication, for example via a CAN bus as described in U.S. Pat. No. 6,273,771, with a controller 24, such as for example a command control module (CCM), and with propulsion control modules (PCM) 26a, 26b associated with the respective propulsion devices 12a, 12b. Each of the controller 24 and the PCMs 26a, 26b may include a memory and a programmable processor. As is conventional, each controller 24, 26a, 26b includes a processor communicatively connected to a storage system comprising a computer-readable medium that includes volatile or nonvolatile memory upon which computer readable code and data is stored. The processor can access the computer readable code and, upon executing the code, carry out functions, such as the navigation control functions and/or the proximity sensing functions, as described in detail below.

The operation console 22 includes a number of user input devices, such as a keypad 28, a joystick 30, a steering wheel 32, and one or more throttle/shift levers 34. The operation console 22 may further include a display 29, such as may be associated with an onboard management system, that is configured to visually present information to the operator (e.g., information regarding control mode, control settings), present control options to the operator, and receive user input from the operator in response to the control options. One example of such a display system is VesselView by Mercury Marine Company of Fond du Lac, Wis. Each of these devices inputs commands to the controller 24. The controller 24, in turn, communicates control instructions to the first and second propulsion devices 12a, 12b by communicating with the PCMs 26a, 26b. The steering wheel 32 and the throttle/shift levers 34 function in a conventional manner such that rotation of the steering wheel 32, for example, activates a transducer that provides a signal to the controller 24 regarding a desired direction of the vessel 10. The controller 24, in turn, sends signals to the PCMs 26a, 26b (and/or TVMs or additional modules if provided), which in turn activate steering actuators to achieve desired orientations of the propulsion devices 12a, 12b. The propulsion devices 12a, 12b are independently steerable about their steering axes. The throttle/shift levers 34 send signals to the controller 24 regarding the desired gear (forward, reverse, or neutral) of the transmissions 16a, 16b and the desired rotational speed of the engines 14a, 14b of the propulsion devices 12a, 12b. The controller 24, in turn, sends signals to the PCMs 26a, 26b, which in turn activate electromechanical actuators in the transmissions 16a, 16b and engines 14a, 14b for shift and throttle, respectively. A manually operable input device, such as the joystick 30, can also be used to provide control input signals to the controller 24. The joystick 30 can be used to allow the operator of the vessel 10 to manually maneuver the vessel 10, such as to achieve lateral translation or rotation of the vessel 10.

The propulsion control system 20 also includes one or more proximity sensors 72, 74, 76, and 78. Although one proximity sensor is shown on each of the bow, stern, port and starboard sides of the vessel 10, fewer or more sensors could be provided at each location and/or provided at other locations, such as on the hardtop of the vessel 10. The proximity sensors 72-78 are distance and directional sensors. For example, the sensors could be radars, sonars, cameras, lasers (e.g. lidars or Leddars), Doppler direction finders, or other devices individually capable of determining both the distance and direction (at least approximately), i.e. the relative position of an object O with respect to the vessel 10, such as a dock, a seawall, a slip, another vessel, a large rock or tree, etc. The sensors 72-78 provide information regarding both a direction of the object with respect to the marine vessel 10 and a shortest distance between the object O and the vessel 10. Alternatively, separate sensors could be provided for sensing direction than are provided for sensing distance, or more than one type of distance/direction sensor can be provided at a single location on the vessel 10. The sensors 72-78 provide this distance and/or direction information to one or more controllers, such as to the sensor processor 70 and/or the CCM 24, such as by way of a dedicated bus connecting the sensors to a controller, a CAN bus, or wireless network transmissions, as described in more detail below.

Regarding the proximity sensors, 72, 74, 76, 78, note that different types of sensors may be used depending on the distance between the vessel 10 and the object O. For example, radar sensors may be used to detect objects at further distances. Once the vessel 10 comes within a particular distance of the object, lidar, ultrasonic, Leddar, or sonar sensors may instead be used. Camera sensors may be used, alone or in combination with any of the sensors mentioned above, in order to provide object proximity information to the CCM 24. Sensors are placed at positions on the vessel 10 so that they are at the correct height and facing direction to detect objects the vessel 10 is likely to encounter. Optimal sensor positions will vary depending on vessel size and configuration.

In FIG. 1, the proximity sensors are positioned at each of the front, sides, and stern of the vessel 10, and include front-facing sensor 72, starboard-facing sensor 74, rear-facing sensor 76, and port-facing sensor 78. In a different exemplary sensor arrangement, two proximity sensors may be placed on the hard top of the marine vessel 10 and arranged such that the fields of view of the two sensors, combined, cover the entire 360° area surrounding the vessel 10. Note also that the relevant controller, such as the sensor processor 70, may selectively operate any one or more of a plurality of sensors (including radars, lidars, Leddars, ultrasonics, and cameras) to sense the shortest distance and the direction of the object with respect to the vessel 10. Alternatively, the sensor processor may use all available sensor data from all sensor types, which may be reviewed real time as it is received or may be formulated into one or more maps or occupancy grids integrating all proximity measurement data, where the mapped data from all the operated sensors is processed as described herein. In such an embodiment, the proximity measurements from each of the various sensors are all translated into a common reference frame.

Autonomous and/or advanced operator assistance (i.e., semi-autonomous) controls for improved vessel handling qualities requires placement of multiple proximity sensors on the vessel 10. In general, these various types of proximity sensing devices (examples described above) are positioned to detect the presence of objects in the marine environment surrounding the marine vessel 10, such as a dock, swimmer, or other obstruction in the path of the vessel. Each sensor reports proximity relative to its own frame of reference—i.e. the distance from the sensor to the object as measured along the view angle of the sensor. Depending on the type of sensor, the application of use, boat size, hull shape, etc., multiple sensor types and sensor locations may be required to provide adequate proximity sensing around the marine vessel 10 for operation in all marine environments. To create a cohesive dataset that can be used for purposes of vessel control and vessel navigation, including autonomous vessel navigation and semi-autonomous control (such as automatic maneuver-limiting control), all of the data sources are preferably translated to a common reference frame. This requires precise knowledge of the location and orientation of each sensor relative to the common reference frame such that the data measured therefrom can be translated appropriately.

In the example of FIG. 1, a main inertial measurement unit (IMU) 36 is installed at a known location on the marine vessel with respect to a predefined point of navigation, such as the center of rotation (COR) or center of gravity (COG). The installation orientation or the main IMU 36 is also known. The installation locations of the main IMU 36 and each proximity sensor 72-78 are established as part of a calibration procedure for the proximity sensing system.

Referencing the example in FIG. 1, the main IMU 36 may be part of an inertial navigation system (INS) such as including one or more micro-electro-mechanical systems (MEMS). For example, the INS 60 may consist of a MEMS angular rate sensor, such as a rate gyro, a MEMS accelerometer, and a magnetometer. Such INS systems are well known in the relevant art. In other embodiments, the motion and angular position (including pitch, roll, and yaw) may be sensed by a differently configured INS 60, or by an attitude heading reference system (AHRS) that provides 3D orientation of the marine vessel 10 by integrating gyroscopic measurements, accelerometer data, and magnetometer data.

The INS 60 receives orientation information from the main IMU 36 and may also receive information from a GPS receiver 40 comprising part of a global positioning system (GPS). The GPS receiver 40 is located at a pre-selected fixed position on the vessel 10, which provides information related to global position of the marine vessel 10. The main IMU 36 is also located at a known and fixed position with respect to the center of navigation determined for the marine vessel 10, such as the COR or COG.

In FIG. 1 an IMU 62-68 is co-located with each proximity sensor 72-78. These sensor IMUs 62-68 may be configured similarly to the main IMU, such as each comprising a rate gyro, an accelerometer, and a magnetometer and producing corresponding IMU data. The IMU data from each sensor IMU 62-68 may be used for various purposes, such as for automatic calibration and verification of the proximity sensor system, for angular measurements used to interpret the proximity measurements by the relevant proximity sensor 72-78, and/or as backup IMUs in case of fault or failure of the main IMU 36.

The inventors have recognized unique problems presented by autonomous and semi-autonomous vessel control systems for operating in marine environments where marine vessels have additional degrees of freedom of movement compared to automotive applications—for example, they can effectuate only lateral and yaw movement without any forward or reverse movement (e.g., in a joysticking mode). Additionally, marine environments pose unique external environmental factors acting on the marine vessel, such as current, wind, waves, or the like. The present inventors have recognized that autonomous and semi-autonomous control systems for marine vessels need to be "aware" of relevant vessel acceleration limits to avoid colliding with obstacles. By knowing the acceleration limit, and by having an awareness of the distance range to obstacles, the control system can determine a maximum vessel velocity that can be realized where the control system has the ability to avoid colliding with known obstacles. The acceleration limit is the maximum acceleration a vessel can reach for both speeding up and slowing down, where maximum deceleration of a marine vessel is accomplished by effectuating a maximum acceleration in the opposite direction.

The inventors have recognized that the above-mentioned operational challenges posed by a marine environment can be effectively dealt with by establishing and maintaining a buffer distance around the marine vessel, where the control authority provided to an operator is limited based on the buffer distance. For example, the propulsion control system may continuously calculate a maximum velocity, or velocity limit, for the marine vessel as it approaches an object O, and may limit an operator's authority in controlling propulsion of the marine vessel 10 such that the propulsion system will not effectuate a thrust that will cause the marine vessel to travel toward the object at a velocity that is greater than the velocity limit. Thus, the propulsion system does not respond to, or carry out, commands that would cause the vessel to violate the buffer distance and venture too close to an object. In certain embodiments, the propulsion control system may be configured to automatically maintain a predetermined buffer distance between the marine vessel 10 and an object O, such as to automatically effectuate propulsion controls in order to force the marine vessel 10 away from a marine object O when the buffer zone is violated.

Figure 2:
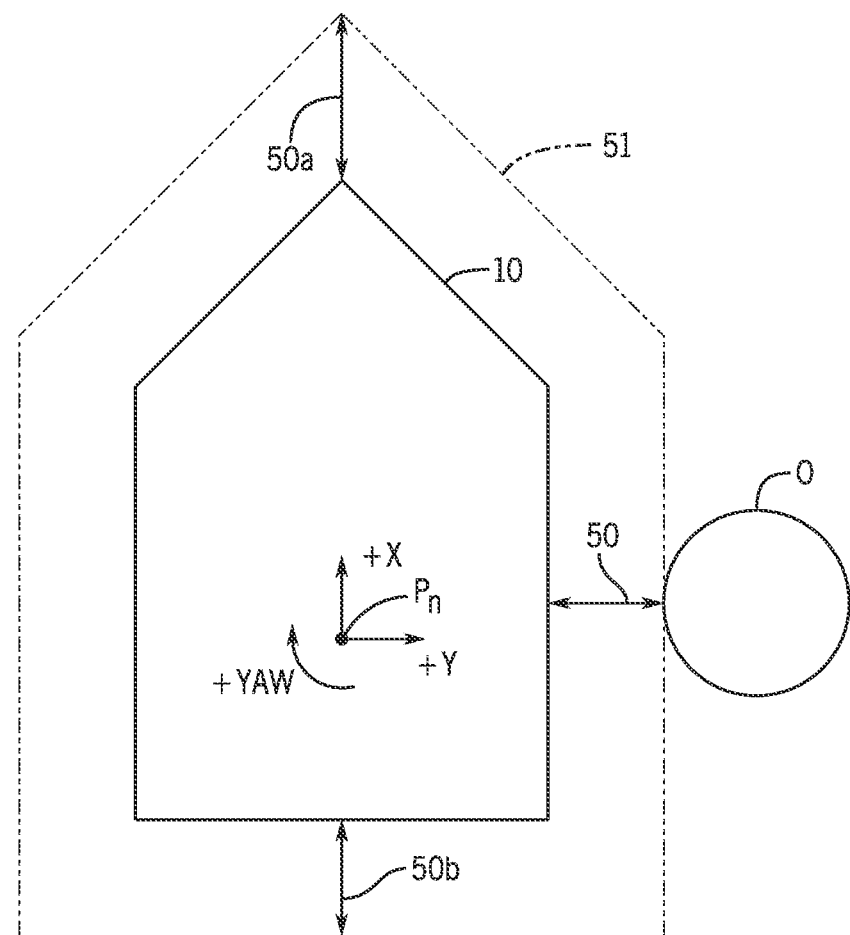
FIG. 2 schematically illustrates one implementation of a buffer distance maintained between a marine vessel and an object according to one embodiment of the present disclosure.

FIG. 2 is a diagram exemplifying this concept, where the marine vessel 10 is maintained at least the predetermined buffer distance 50 from the object O. A buffer zone 51 around the marine vessel 10 is defined, and velocity limits are calculated in order to progressively decrease the vessel velocity as it approaches the preset buffer distance 50 from the object O. In the depicted embodiment, the buffer zone 51 is established at a preset buffer distance 50 that is equal around all sides of the marine vessel. In certain embodiments, the buffer zone 51 may be asymmetrical with respect to the marine vessel, such as to provide a greater buffer distance 50a at the front side of the marine vessel than the buffer distance 50b on the rear side of the marine vessel. Similarly, a buffer distance on the starboard and port sides of the marine vessel 10 may be set the same or different than the front and rear buffer distances 50a, 50b.

The inventors have further recognized that maintenance of the buffer zone is not always desired or practical, such as when passengers are getting on and off the marine vessel. Through their experimentation and research, the inventors have recognized that maintenance of a minimum buffer distance between the marine vessel and an object, such as a dock, for instance, does not necessarily position the marine vessel well for passengers to disembark safely from a marine vessel. Depending on the vessel shape and the dock shape, holding a vessel parallel to the dock will not necessarily get passengers close enough to disembark safely and easily from the marine vessel. Moreover, holding the marine vessel steady at precisely the minimum buffer distance can be quite challenging or even impossible. Marine environmental factors and conditions, such as in heavy wind and waves, can inflict unpredictable forces affecting vessel movement.

Moreover, many proximity sensing systems have minimum detection distances that fall short of the minimum distance for safe disembarking, and control systems implementing such proximity sensors cannot reliably hold the marine vessel at a minimum distance that is less than their minimum reliable detection capabilities.

In view of their recognition of the foregoing challenges and problems, the inventors have developed the disclosed docking system that limits an operator's authority to control propulsion of the marine vessel in the direction of the object so as to provide a controlled approach and impact to an object, such as a dock. The disclosed control system modifies or disables collision avoidance algorithms, such as the velocity limiting and autonomous buffer maintenance controls, upon receipt of a user-generated instruction to suspend the maintenance of the buffer distance from the object. The control system remains responsive to user control inputs via a user input device, such as a joystick, to move the marine vessel in the direction of the object so as to provide a smooth and controlled impact between the marine vessel and the object, and/or to hold the marine vessel against the object, such as while passengers disembark. The user control, such as via the joystick 30, remains intuitive during the velocity limited control modality. For example, the limited user input authority provided via the joystick may be implemented by rescaling and/or offsetting the propulsion commands associated with the joystick positions. For example, the user control input provided by the joystick may be rescaled, such as to 20% of the normal propulsion instruction. Thereby, the operator's authority is limited to 20% of the normal authority while the marine vessel is operating within the buffer zone. In another embodiment, an offset may be applied to the user control input from the joystick such that no propulsion output is generated for a portion of the joystick range, such as the first 50% of the joystick range or the first 80% of the joystick range. Thereby, the operator recognizes a change in the responsiveness of the user input device and intuitively understands that the control functions associated with the joystick are modified.

The autonomous or semi-autonomous control algorithms, such as effectuated by the controller 24 include velocity control software performing algorithms to calculate a maximum velocity for the marine vessel 10 as it approaches an object O and effectuates velocity limits accordingly. In one embodiment, the velocity limits may be calculated based on a known maximum acceleration for the marine vessel. The maximum acceleration for the marine vessel may be based on the maximum vessel capabilities, such as the maximum positive or negative acceleration that can be effectuated by the propulsion system on the marine vessel 10 in the relevant direction of travel. Alternatively or additionally, the maximum acceleration for the marine vessel 10 may be predetermined, such as based on handling, comfort, or safety metrics.

The velocity limit, then, may be calculated based on that known acceleration limit based on the distance of an object O from the marine vessel 10, accounting for the buffer distance 50. Given that acceleration is the derivative of velocity, the relationship between a maximum acceleration for the marine vessel and a maximum velocity with respect to a distance to an object can be provided according to the following:

$$a_{max} = \frac{v_{max} - v_{final}}{\Delta r / v_{max}}$$

wherein Δr is the allowable range to an object, which will be the measured distance to an object minus the predetermined buffer distance, and wherein $a_{max}$ is the known maximum acceleration for the marine vessel, and wherein $v_{final}$ is the velocity reached at the point where the object O hits the butter zone 51 and where $v_{max}$ is the maximum velocity. Assuming that $v_{final}$ equals zero, the equation can be rearranged to solve for the maximum velocity in the direction of the object Δr that guarantees the ability to stop without exceeding $a_{max}$. Accordingly, $v_{max}$ can be calculated as:

$$v_{max} = \sqrt{\Delta r a_{max}}$$

Imaginary numbers can be avoided by using the absolute value of the root function before calculating, such as by using the signum function of the contents of the root function to identify the direction of the maximum velocity. Thus, $v_{max}$ can be represented as the following:

$$v_{max} = \text{sgn}(\Delta r\, a_{max})\sqrt{|\Delta r a_{max}|}$$

Figure 3A:
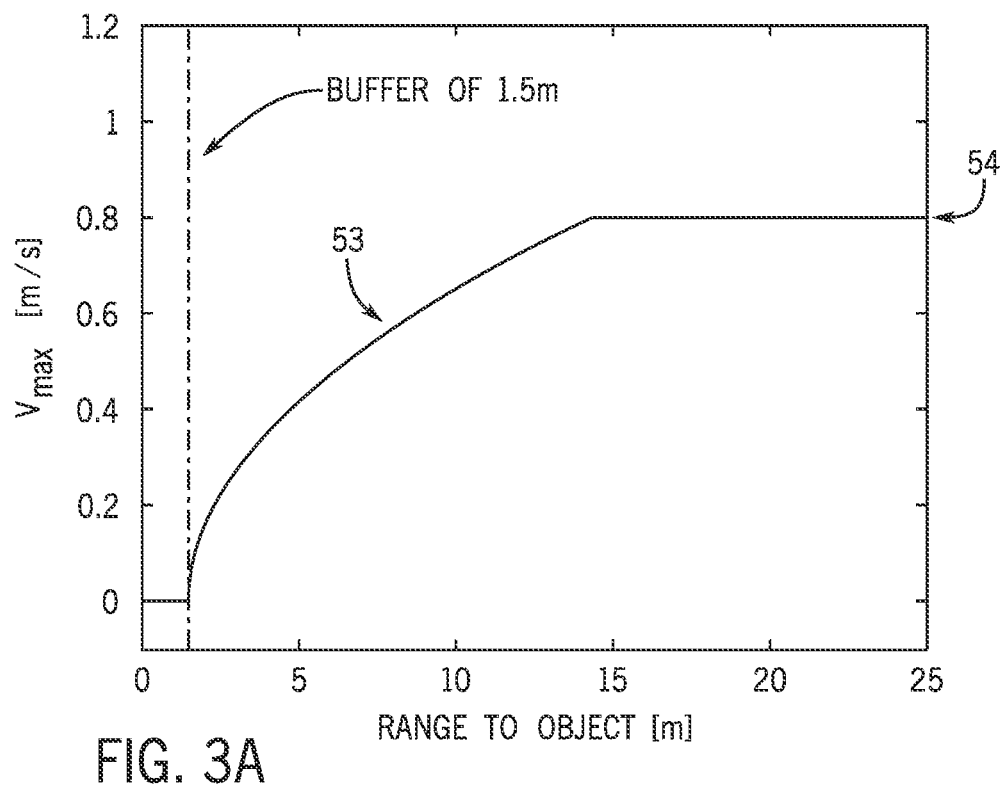
FIGS. 3A and 3B are graphs showing exemplary velocity limit ranges for an exemplary buffer distance of 1.5 meters.
Figure 3B:
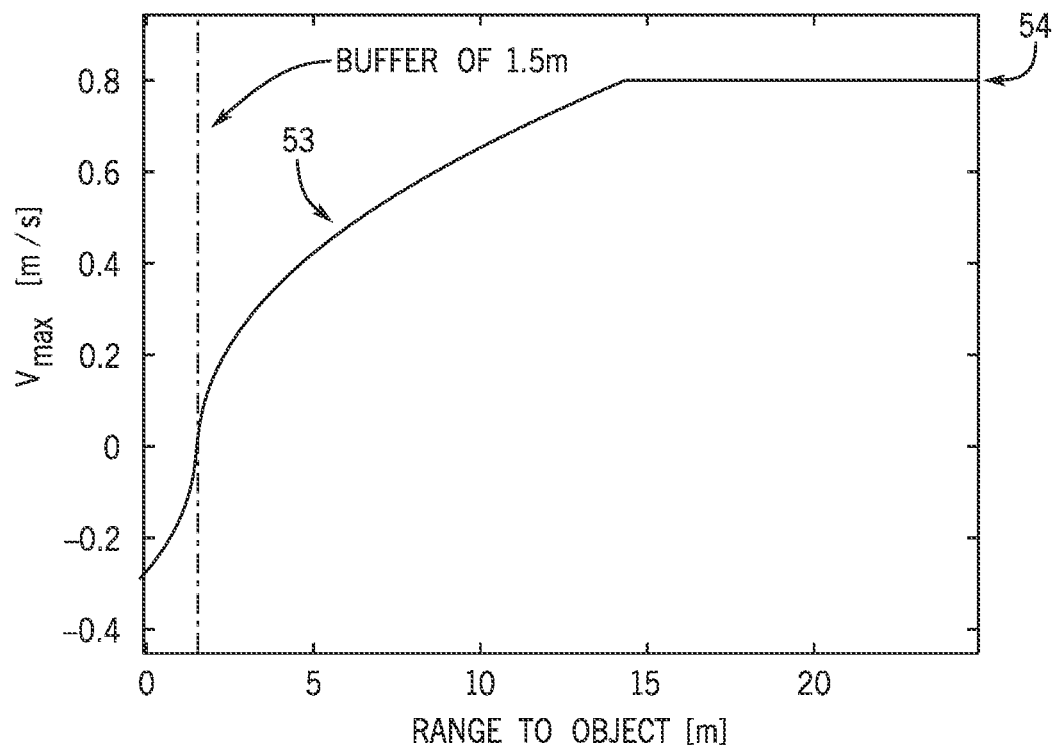

FIGS. 3A and 3B are graphs depicting velocity limit with respect to object distance for exemplary control scenarios where the preset buffer distance 50 around the marine vessel 10 is 1.5 meters. The velocity limit 53 decreases as the marine vessel 10 approaches the object O. When the marine vessel is 15 meters from the object O, for example, the velocity limit 53 in the direction of the object O is at a maximum of 0.8 m/s, and that velocity limit decreases as the marine vessel 10 moves towards the object O such that the velocity limit is zero when the marine vessel is at the buffer distance 50 of 1.5 meters from object O. Thus, inside the buffer zone 51, the operator does not have authority, such as via the joystick or other steering and thrust input device, to move the marine vessel 10 closer to the object. Accordingly, no thrust will be provided in the direction of the object O if the marine vessel is less than or equal to the preset buffer distance 50 from the object O, even if the operator provides input (such as via the joystick 30) instructing movement in the direction of the object O.

In the embodiment represented at FIG. 3A, the velocity limit 53 in the direction of the object may remain at zero while the buffer distance 50 is violated. Thereby, user authority will be limited such that user control input (e.g. via the joystick) to move the marine vessel 10 in the direction of the object will not be acted upon by the propulsion system 20. In other embodiments, the velocity limit 53 may be zero at the buffer distance 50 and then become negative once the distance to the object O is less than the buffer distance. In the scenario in FIG. 3B, the velocity limit 53 will become negative when the distance to the object is less than 1.5 meters and may become progressively more negative, increasing propulsion in the opposite direction of the object in order to propel the vessel away from the object O. The control system may be configured such that the negative velocity limit 53 is converted to a control command to effectuate a thrust away from the object O so that the marine vessel 10 is maintained at least the buffer distance 50 away from the object O.

As also illustrated in FIGS. 3A and 3B, a maximum propulsion authority 54 may be utilized, which sets a maximum for the velocity limit 53. The maximum propulsion authority 54 may be a predetermined value based on handling, comfort, or safety metrics for the relevant mode of operation where the disclosed velocity control is implemented, such as in a joysticking mode or a docking mode of operation where the control algorithms are configured to provide precise propulsion control of the marine vessel 10 operating at relatively low velocities. In the depicted examples, the maximum propulsion authority 54 is 0.8 m/s; however, faster or slower maximum speeds may be implemented depending on the vessel configuration and the expected control demands for the relevant mode of operation. The +/−yaw propulsion directions may have a maximum propulsion authority value in radians. Furthermore, different maximum propulsion authority values may be associated with different directions. For instance, the maximum propulsion authority value for the positive Y, or forward, direction may be higher than the maximum propulsion authority value for the negative Y, or backward, direction.

In one embodiment, the proximity sensor system, e.g., the proximity sensors 72-78 in concert with the sensor processor 70, may be configured to generate a most important object (MIO) dataset identifying a select set of closest proximity measurements. For example, the MIO dataset may identify distances in each of the six directions that a boat has control authority—+/−X, +/−Y, and +/−yaw directions—thereby informing the navigation controller of navigation constraints based on the location of objects O around the marine vessel. For example, the closest proximity measurements may be identified based on one or more simplified two-dimensional vessel outlines representing the vessel hull. In such an embodiment, the MIO dataset may be calculated using the simplified boat profile and low-computation-load geometry to generate the MIO dataset identifying the closest proximity measurements in each possible direction of movement of the marine vessel 10. In one embodiment, the MIO dataset includes six values specifying one closest proximity measurement in each of the +/−X directions, +/−Y directions, and +/−yaw rotational directions.

In certain embodiments, the MIO dataset may always contain six values defining the closest proximity measurements in each of the aforementioned directions of movement. Thus, if no proximity measurements are detected in a particular direction, then a default large number may be provided which will be interpreted as non-limiting in the respective direction. To provide just one example, the default distance in the +/−yaw direction may be +/−180°. The navigation controller (e.g. controller 24) will interpret that default large rotation angle range to mean that the vessel can turn 1800 without colliding with any object in the yaw direction. In other embodiments, the default large number may be greater than 1800 (even as large as 360°), or may be smaller than 180°, such as 90°. The default large value in the X and Y directions may be a large value, such as 10,000 meters, 50,000 meters, or more. In any such case, the default distance is large enough that the navigation controller will not limit any vessel movement based on the relevant default MIO data point. In other embodiments, the system 20 may be configured such that less than six numbers may be provided for the MIO dataset. Thus, where no proximity measurements 90 are detected in a particular direction, a null value or no value may be reported as part of the MIO dataset.

Figure 4:
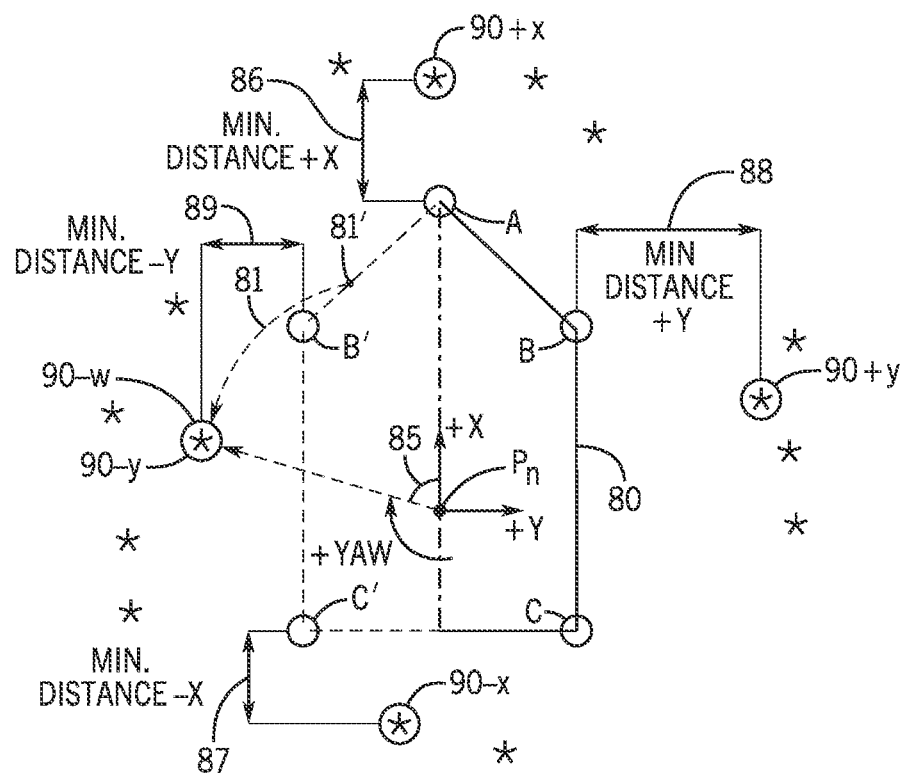
FIG. 4 is a diagram illustrating an exemplary calculation of a most important object (MIO) dataset identifying closest proximity measurements.

As illustrated in FIG. 4, the two-dimensional vessel outline may be represented as a set of Cartesian points defined with respect to a point of navigation $P_n$. For instance, the two-dimensional vessel outline may be a set of five points forming the shape of a pentagon around $P_n$, where the center point (00) is the navigation point $P_n$ (i.e., the center of navigation) of the marine vessel. Referring to the example at FIG. 2, the three Cartesian points include the front point A, starboard corner point B, starboard back point C, the port corner point B', and the port back point C'.

In FIG. 4, the two-dimensional vessel outline 80 is presented with respect to multiple proximity measurements

90. The four linearly-closest proximity measurements $90_{+x}$, $90_{-x}$, $90_{+y}$, and $90_{-y}$ are determined as the four closest proximity measurements in each direction along the X-axis and the Y-axis, sequentially. For example, the proximity measurement with the minimum distance 86 in the positive X direction from the front-most point of the vessel model, the front point A, is determined as the closest proximity measurement $90_{+x}$. The proximity measurement 90 with the minimum distance 87 in the negative X direction as measured along the X-axis from the X-value of the back points C and C' is the closest proximity measurement $90_{-x}$. The proximity measurement 90 with the minimum distance 88 in along the Y-axis from the Y-value of starboard points B and C is the closest proximity measurement $90_{+y}$. The minimum distance 89 in the direction of the negative Y-axis from the Y-values of the port points B' and C' is the closest proximity measurement $90_{-y}$.

In addition to the linearly-closest proximity measurements, rotationally-closest proximity measurements may also be calculated, which are the closest proximity measurements in the positive yaw direction and the negative yaw direction. In other words, the rotationally-closest proximity measurements include the point that will first touch the two-dimensional vessel outline 80 as it rotates about the point of navigation $P_n$ in the positive yaw direction (clockwise) and the point that will first touch the two-dimensional vessel outline 80 as it rotates about $P_n$ in the negative yaw direction (counterclockwise). The two rotationally-closest proximity measurements may be used to identify the yaw angles to which the marine vessel can rotate without colliding with an object. The smallest positive yaw angle and smallest negative yaw angle may be included in the MIO dataset so that the vessel navigation controller can properly limit the movement of the marine vessel to avoid collision.

For those proximity measurements 90 near the marine vessel 10, at least one yaw path will be calculated between the respective proximity measurement and one or more intersection points on the two-dimensional vessel outline 80. Referring to FIG. 4, one or more yaw paths 81 will be calculated for each nearby proximity measurement 90, including each of the linearly-closest proximity measurements $90_{+x}$, $90_{-x}$, $90_{+y}$, and $90_{-y}$. For each yaw path 81 determined for each proximity measurement 90, a yaw angle 85 is determined, which may be a positive yaw angle or a negative yaw angle (depending on the path 81 of rotation). The smallest positive and negative yaw angles 85 are included in the MIO dataset as the closest positive yaw direction proximity measurement $90_{+w}$, and the closest negative yaw direction proximity measurement $90_{-w}$. For calculating the yaw path for each proximity measurement 90, a circle may be defined having a radius between the point of navigation $P_n$ and the respective proximity measurement 90. FIG. 4 represents one such calculation, where the proximity measurement circle is defined for calculating the yaw path 81. At least one intersection point 81' is identified between the proximity measurement path 81 and the two-dimensional vessel outline 80.

Velocity limits are then calculated based on the MIO dataset providing the closest proximity measurements in each of the +/−X direction, +/−Y direction, and +/−yaw direction. For example, a velocity limit may be calculated for each point in the MIO dataset, thus resulting in continual calculation of a velocity limit in each of the +/−X directions, +/−Y directions, and +/−yaw directions.

Figure 5A:
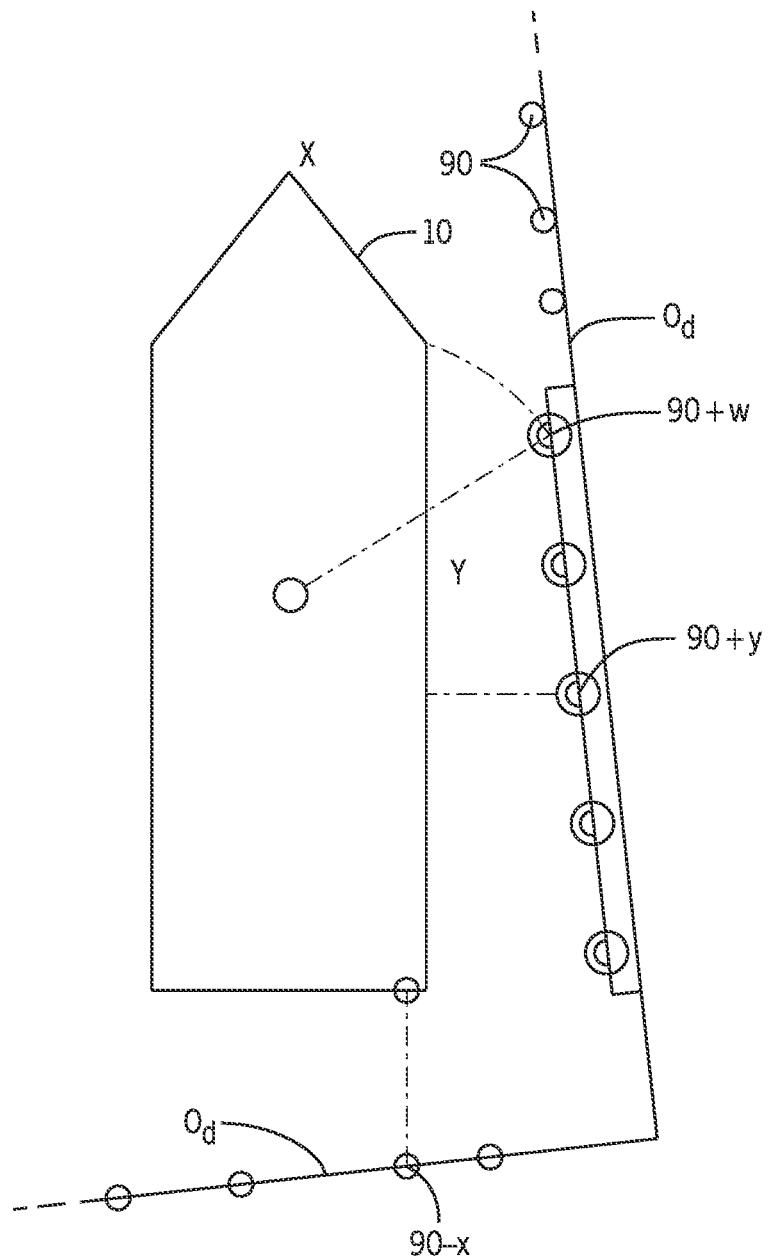
FIG. 5A illustrates an exemplary scenario where velocity limits are calculated in the direction of each of multiple objects.

In FIG. 5A, the marine vessel 10 is shown approaching the object $O_d$, which is a dock where multiple proximity measurements 90 are identified defining the dock. Several closest proximity measurements are also identified, including a closest proximity measurement in the negative X direction $90_{-x}$, a closest proximity measurement in the positive Y direction $90_{+y}$, and a closest proximity measurement in the +yaw rotational direction $90_{+w}$. As the marine vessel 10 approaches the dock $O_d$, velocity limits are calculated based on those identified closest proximity points. Three exemplary velocity limits are illustrated, which include a negative X direction velocity limit, the positive Y direction velocity limit, and the positive yaw rotational velocity limit. For example, each velocity limit may be calculated using the velocity limit formula described above, where Δr is each distance measurement adjusted by the preset buffer distance 50. The formula can be equally applied to rotational (yaw) velocity control by using angular velocity and acceleration instead of linear velocity and acceleration.

In certain embodiments, the marine vessel may be configured to autonomously control the propulsion devices 12a, 12b to maintain at least the predetermined buffer distance 50 between the marine vessel 10 and an object O. Thus, where the buffer zone 51 is violated, the relevant controller executing velocity control software 25, the propulsion controller, may generate instructions to the propulsion devices 12a, 12b to move the marine vessel such that the buffer zone 51 is not violated. Where an object O, such as a dock $O_d$ or seawall, spans the length of the marine vessel 10, positive and negative yaw direction limits will come into play, where zero or negative yaw velocity limits in one or the other direction will result in propulsion control instructions that rotate the marine vessel so as not to violate the buffer zone 51.

The positive and negative yaw direction limits and control instructions to maintain the buffer zone 51 will result in the marine vessel self-aligning with the object O, such as a seawall or a dock. The propulsion controller, such as the central controller 24 executing velocity control software 25, will operate to rotate the marine vessel to align with the dock $O_d$ because a thrust instruction causing rotation of the vessel will be generated if a portion of the marine vessel becomes closer to the object $O_d$ and thus violates a portion of the buffer zone 51. In such an instance, the relevant yaw velocity limit $90_{+w}$, $90_{-w}$ will become negative, which will result in a thrust instruction to rotate the marine vessel to move the closest end of the vessel away from the object. Referring to FIG. 5A, if the velocity limit $90_{+w}$ becomes negative, then the marine vessel 10 will be rotated counterclockwise until the proximity measurement $90_{+w}$ in the negative yaw direction is at least the buffer distance from the relevant object point. Thereby, the marine vessel 10 is caused to align with the length of the dock $O_d$ such that neither of the yaw velocity limits are negative. Accordingly, with respect to the scenario depicted in FIG. 5A, if an operator were to instruct lateral movement towards the object O, such as by holding the joystick 30 laterally toward the dock $O_d$, the propulsion controller would cause the marine vessel to self-align with the dock $O_d$ and to maintain a clearance from the dock equal to the preset buffer distance 50.

Similarly, where a marine vessel is being steered within a tight space, such as in a slip, the propulsion controller will operate to maintain the buffer distance on all sides of the marine vessel where the object O appears. Where the marine vessel is being positioned in a slip or a similar tight space, the buffer distance on two sides of the marine vessel must be violated. The controller 70 implementing the autonomous thrust instructions based on negative velocity limits, as described above, will act to center the marine vessel 10 within the objects appearing on either side. There, a negative thrust control will be generated based on objects on opposing sides of the marine vessel, such as both in the positive Y direction and the negative Y direction. Where the marine vessel ventures closer to the object on one side than the other, the negative thrust instruction in the opposite direction of the closer side will be greater than that generated in the opposite instruction. Thus, the thrust instructions generated from the negative velocity limits will only be executed if the marine vessel is closer to an object on one side than the other, and the velocity limits will tend to cancel each other out and cause the marine vessel to center within the objects on either side.

When the operator wants to suspend, or override, maintenance of the buffer distance by the propulsion control system 20, the operator provides input, such as via a user input device on the operation console 22. The user-generated instruction to suspend maintenance of the buffer distance 50 may be by any user input device or system that allows the operator to provide an intentional input that acknowledges that the marine vessel is near an object and that the operator intends to override the collision avoidance algorithm to allow the marine vessel to approach and impact the object O. For example, one or more buttons 31 may be provided on or near the joystick 30 that are depressible by the operator to suspend maintenance of the buffer distance 50 from an object O. In another embodiment, the user input option to suspend the buffer maintenance may be via the joystick, such as imposing a detent at some point in the movement range of the joystick 30 that the operator must overcome to suspend maintenance of the buffer distance 50 and move the marine vessel toward the object O.

Alternatively, the user input may be provided by other means. For example, the display 29 on the operation console 22 may be configured to present a user input option to the operator to suspend maintenance of the buffer distance 50 in one or all directions with respect to the marine vessel 10. In one embodiment, the display 29 may be controlled to present a user input option to suspend maintenance of the buffer distance 50 when the marine vessel is within a predetermined distance of the object O (e.g., dock $O_d$). In such an embodiment, the option to suspend the buffer zone may be presented or otherwise available to the operator when the marine vessel is at the buffer distance 50, or within a predetermined range of the buffer distance 50. In other embodiments, the option to suspend the buffer zone 51 entirely or the buffer distance 50 in select directions may be available any time that the user input authority is being limited below the maximum propulsion authority 54.

In certain embodiments, the user input device may allow the user to specify a portion, or side, of the marine vessel where the buffer maintenance will be suspended, or specify an object O that the marine vessel should be permitted to impact. For example, a user input device may allow an operator to select at least one of a port side, a starboard side, a rear side, or a front side of the marine vessel 10 at which the buffer distance will no longer be maintained. To provide one example, a display on the operation console 22 may present a schematic of the marine vessel allowing an operator to select, such as via touching the screen, one or more sides of the marine vessel where the control system 20 will permit the buffer zone 51 to be violated. In another embodiment, multiple buttons 31 may be provided on or near the joystick 30, each associated with a side of the marine vessel 10. The buttons may be individually selectable to allow the operator to select a side of the marine vessel where maintenance of the buffer distance 50 will be suspended by pushing the button 31 associated with that side.

In an embodiment where the user input device allows an operator, or user, to select a location for suspension of the buffer distance 50, the user-generated instruction provided to the control system by the user input device will then specify the location for suspension selected by the user. Only a portion of the buffer zone 51 will be suspended, and the buffer distance 50 will be maintained on all other sides of the marine vessel as described above. Thereby, the control system 20 will act on the user control input to propel the marine vessel toward the object O while still avoiding objects in the non-selected directions. Referring to FIG. 5A, for example, where the operator selects to approach the dock $O_d$ on the starboard side, the propulsion controller may still operate to maintain the buffer distance between the dock and the vessel 10 on the rear side (i.e., in the negative X direction).

Alternatively, the system 20 may be configured to suspend maintenance of the buffer zone 51 altogether such that the buffer distance 50 is no longer maintained on any side of the marine vessel 10. In still other embodiments, the control system 20 may be configured to automatically determine which side to suspend the buffer distance 50 based on the detected objects and the direction of the user control input directing propulsion of the marine vessel. Thus, if the operator is providing a propulsion control input to move the marine vessel in the direction of the object O, and the object is within a predetermined distance, the propulsion controller may interpret the user-generated instruction as an instruction to suspend maintenance of the buffer distance 50 in the direction of the object O.

In response to the user-generated override instruction, the control system 20 will act on the user control input to propel the marine vessel toward the object O and allow the marine vessel 10 to impact the object O in a controlled way. In certain embodiments the propulsion controller may continue to employ the velocity controls described herein to limit the user input authority over how quickly the marine vessel 10 can approach the object O. The propulsion controller may be configured to suspend maintenance of a portion of the buffer zone 51 in response to the user-generated instruction by changing the buffer distance on the respective side of the marine vessel. Thereby, the buffer distance algorithm can continue to run and the buffer distance 50 will be maintained on all other sides of the marine vessel, but the operator will have limited authority to approach and impact the object O.

Figure 5B:
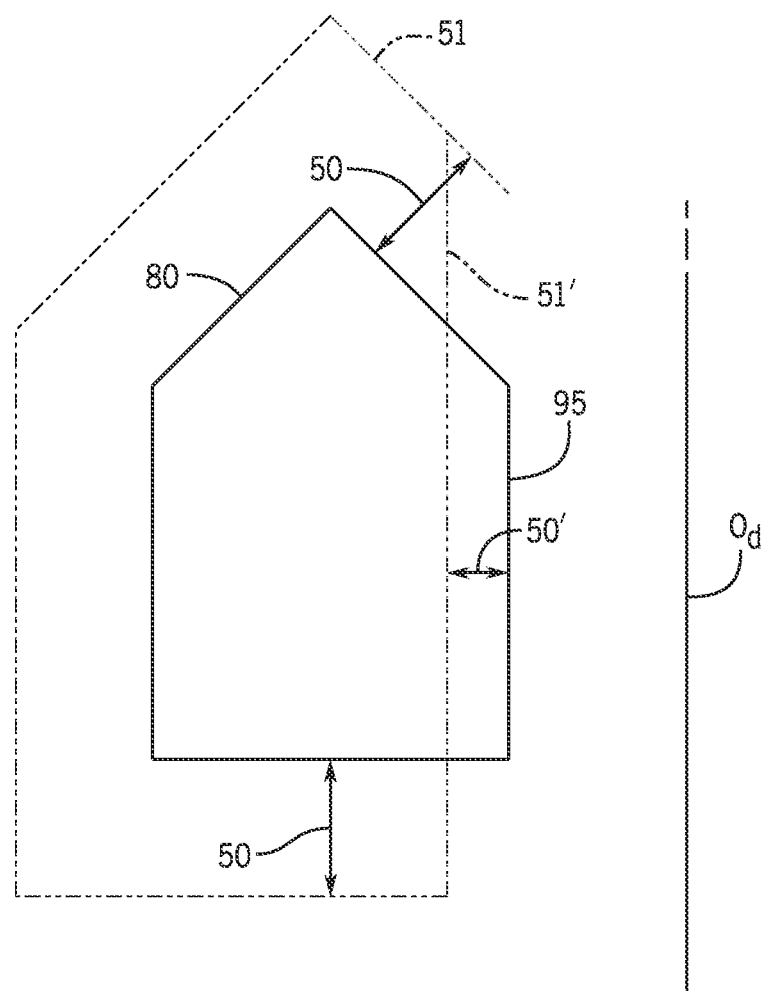
FIG. 5B illustrates an exemplary modified buffer zone used to impose velocity limits that permit the marine vessel to approach and impact an object.

FIG. 5B illustrates one such example employing the vessel outline 80. The modified buffer distance value 50' on the starboard side 95 of the vessel outline 80 (which corresponds to the starboard side of the marine vessel 10) is changed from the original buffer distance 50. Thus, the velocity limit calculations on the starboard side of the marine vessel will permit the marine vessel 10 to approach and impact the dock $O_d$. In the depicted embodiment, the modified buffer distance value 50' on the starboard side 95 is changed to a negative number such that the line for that portion 51' of the corresponding side buffer zone 51 is moved to inside the starboard side of the marine vessel 10. Thereby, the modified buffer distance value 50' gets added to the proximity measurements 90 for the object $O_d$ on that side of the marine vessel 10. This essentially makes the control system think that the dock $O_d$ is further away than it actually is and to calculate the velocity limits accordingly. While limited, the operator still has propulsion authority to move the marine vessel 10 toward the object O, even when the marine vessel is contacting the object. The greater the magnitude of the modified buffer distance value 50', and thus the further inward from the starboard side 95 of the vessel outline 80, the more authority will be available to the operator, or user, to allow the marine vessel 10 to approach and impact the object $O_d$.

In other embodiments, the modified buffer distance value 50' on the selected side 95 of the marine vessel may be changed to zero. This puts the buffer distance exactly at the starboard side 95 of the vessel outline 80. In such an embodiment, the velocity limit will be zero at the point where the starboard side 95 reaches the edge of the object $O_d$. Thus, when the proximity sensor system determines that the distance between the marine vessel 10 (e.g. represented by the vessel outline 80) is zero, the operator will not have any authority to move the marine vessel 10 further toward or against the object O. Such an embodiment may be insufficient for certain vessel configurations or dock configurations, where the portion of the marine vessel 10 from which passengers embark and disembark may not be close enough to the dock $O_d$. In those situations, providing a negative modified buffer distance value 50' may be more desirable so that the operator, or user, has some authority to maintain the marine vessel 10 against the dock $O_d$. Exemplary methods for calculation of velocity limit control and implementation of a user-generated instruction to suspend maintenance of the buffer distance are presented and described below with respect to FIGS. 6 and 7.

In certain embodiments, an alert may be generated notifying the user that the buffer distance is no longer being maintained. The alert may, for example, specify the direction or side of the vessel where the buffer distance 50 is modified or eliminated, thereby advising the user that collision with an object on that side is possible or likely. In various examples, the alert may be provided via the display 29, such as a text or graphic alert displayed thereon. Alternatively or additionally, the alert may be provided via the joystick, such as by haptic and/or visual means. For example, the joystick may include one or more light indicators that illuminate to correspond with and indicate the side(s) of the vessel where the buffer distance is no longer being maintained.

The velocity limit calculation is executed by one or more controllers with the control system 20. Referring again to FIG. 1, the sensor processor 70 receives the proximity measurement from each of the proximity sensors 72-78, and in such an embodiment may be configured with software to perform the MIO dataset identification and may provide the MIO dataset to a controller performing the velocity limit calculation. The controller performing the velocity limit calculation is referred to herein as the propulsion controller, which may be any controller configured to execute velocity control software 25 having computer-executable instructions to cause that controller to perform as described herein. In FIG. 1, the propulsion controller may be, for example, the CCM 24 storing and executing velocity control software instructions 25. In such an embodiment, each of the sensor processor 70 and the central controller 24 includes its own storage system comprising memory and its own processing system that executes programs and accesses data stored in the respective storage system.

In other embodiments, the sensor processor 70 may store and execute the velocity control software 25 and thus may perform as the propulsion controller. In still other embodiments, a dedicated, special-purpose propulsion controller may be provided, such as a computing system storing and executing the velocity control software 25 and configured to receive proximity measurements, such as from the sensor processor 70, and to output velocity limits, which in various embodiments may be provided to the CCM 24 or to each PCM 26a, 26b. In still other embodiments, the proximity assessment functionality described herein as belonging to the sensor processor 70 and the velocity control functionality may both be performed by a single controller, such as the central controller 24.

Given the large amount of proximity data produced by the proximity sensors 72-78, the connection between the sensors 72-78 and the sensor processor 70 may be via a dedicated bus or network connection. This dedicated bus or network connection is separate from the vessel network in order to allow transmission of a large amount of proximity measurement data (and, in some embodiments, IMU data) to the sensor processor 70. Such massive data transmission may not be possible on a typical vessel network, such as a CAN bus or wireless network where multiple devices are communicating. The sensor processor 70 may be configured to communicate filtered proximity data on the vessel network, such as a CAN bus or wireless network, such as the MIO dataset. In still other embodiments, a dedicated communication link may be provided between the sensor processor 70 and the propulsion controller, such as the central controller 24.

Figure 6:
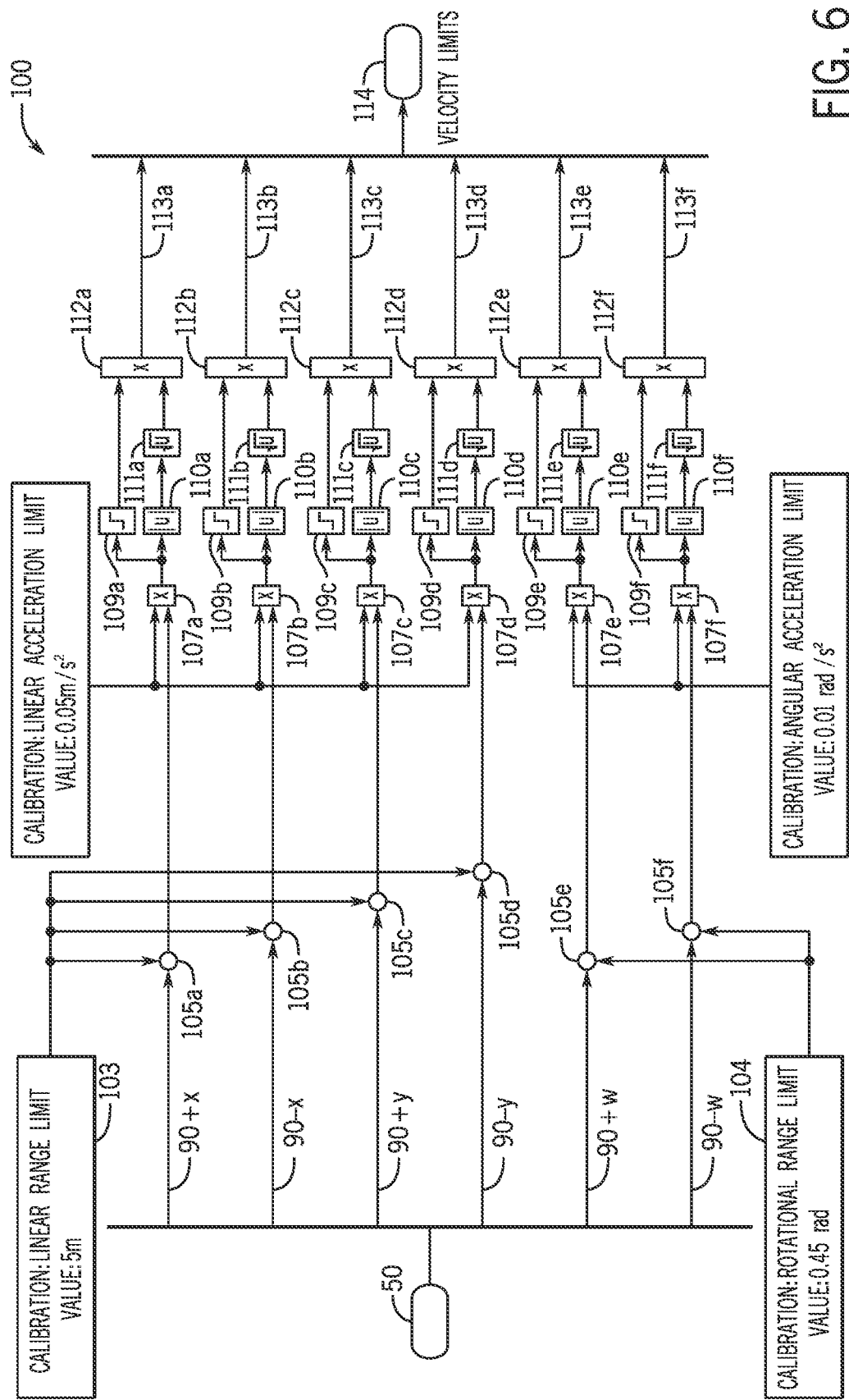
FIG. 6 is a flowchart exemplifying velocity limit calculations according to one embodiment of the disclosure.

FIG. 6 depicts one embodiment of a propulsion control method 100 implementing proximity-based velocity limiting as described herein. Six closest proximity measurement values are provided, one in each of the +/−X direction, +/−Y direction, and +/−yaw direction. The preset buffer distance 50, or "minimum range" that must be maintained from an object, is defined and provided, where the linear range limit is provided at block 103 and the rotational range limit is provided at block 104. In the example, the linear range limit is 5 m. Note that the range limit in the angular direction is an angular measurement, which in the example is 0.45 radians. The minimum range is then either added or subtracted from the respective distance value depending on the direction (and thus the sign) of the respective distance value. Summing blocks 105a-105f are each configured to assign the appropriate sign to the preset buffer value.

The velocity limit is then calculated accordingly based on the distance values and the maximum acceleration set for the marine vessel. In the example, the linear maximum acceleration is 0.05 m/s$^2$ and the angular acceleration limit is 0.01 rad/s$^2$. The maximum linear acceleration is provided to each of blocks 107a-107d, which is the maximum acceleration in the relevant Cartesian direction. Similarly, the maximum angular acceleration is provided to each of blocks 107e and 107f, which is the maximum acceleration in the relevant positive or negative yaw direction. At block 107 the relevant distance range (e.g. Ar described above) is multiplied by the corresponding maximum acceleration. Before the absolute value is taken of the outputs at blocks 110a-110f, the sign of the relevant velocity calculation is determined at signum function blocks 109a-109f. The square root of the absolute value is then calculated at blocks 111a-111f. The velocity limit is then determined at blocks 112a-11f for each of the six directions, and all six velocity limit values 113a-113f are outputted at block 114.

Figure 7:
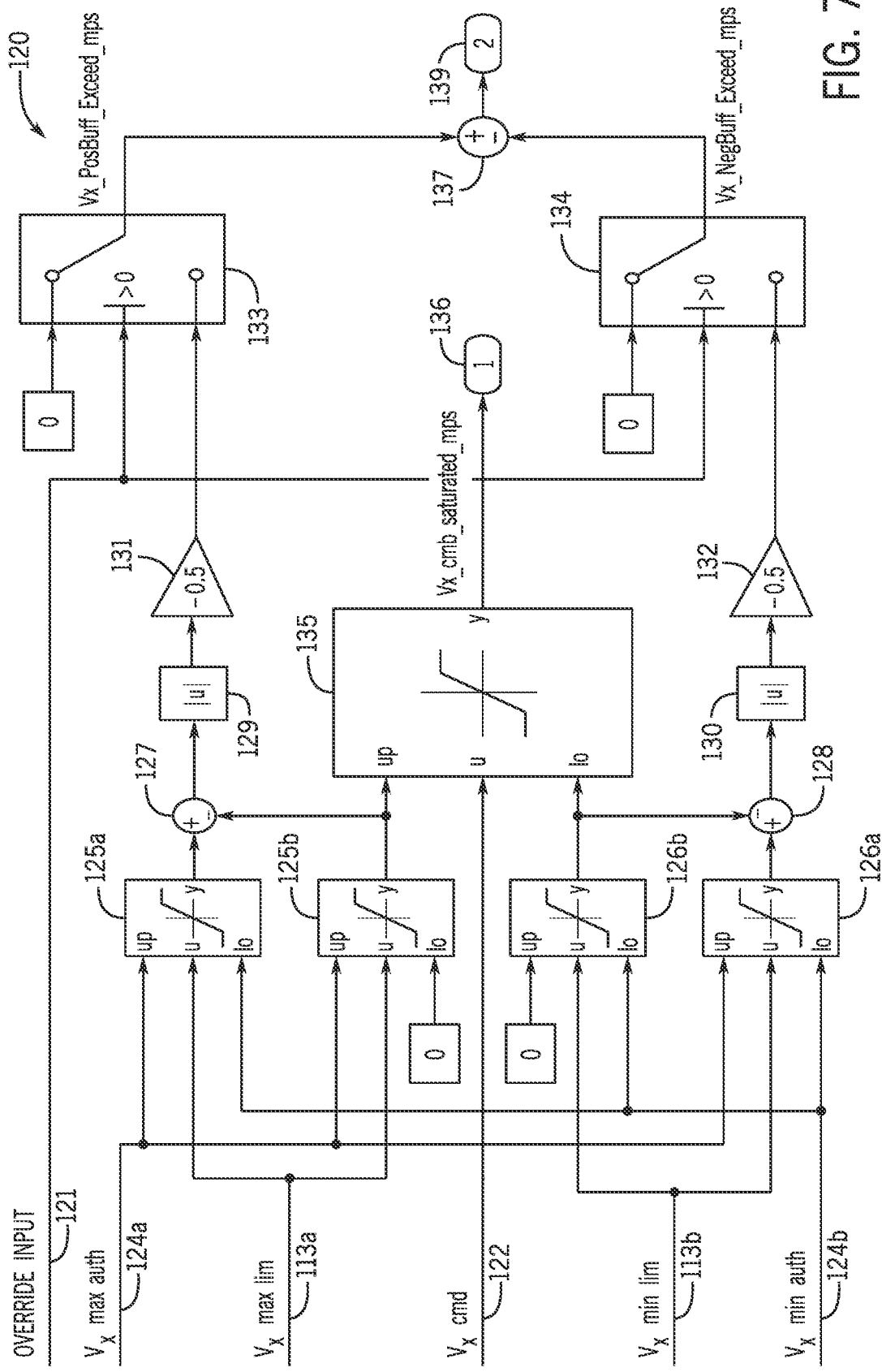
FIG. 7 is a flowchart exemplifying calculation of a velocity command in a direction of an object based on a velocity limit.

FIG. 7 depicts an exemplary method 120 of velocity limit implementation. FIG. 7 exemplifies velocity command determination in the positive and negative X directions based on the +/−X velocity limits 113a and 113b. The velocity limit is calculated based on the user control input 122, such as via the joystick 30. In the depicted example, a positive or negative X-direction propulsion command is determined based on the user control input 122 (which in the depicted embodiment is an initial velocity value associated with the joystick position), +/−X velocity limits 113*a* and 113*b*, and the maximum propulsion authority values 124*a* and 124*b* in the positive and negative X directions. If the user control input 122 is positive, then a positive X direction propulsion command is generated; if the user control input 122 is negative, then a negative X direction command is generated. In the depicted example, the velocity limit values 113*a*-113*f* are unbounded values calculated based on the respective closest proximity measurement. The calculated velocity limits 113*a* or 113*b* is limited, or capped, based on the maximum propulsion authority 124*a*, 124*b* at blocks 125*a*, 125*b* and 126*a*, 126*b*. In particular, a capped velocity limit in the positive X direction is calculated at blocks 125*a* and 125*b*. At block 125*a*, the velocity limit is bounded by both the positive and negative X-direction authority values 124*a* and 125*b*, meaning that the velocity limit outputted from block 125*a* may be negative where the marine vessel is less than the buffer distance from the object. At block 125*b*, however, the velocity limit is bounded between the maximum authority 124*a* in the positive X direction and zero, meaning that the outputted velocity limit will be zero when the proximity measurements are less than or equal to the buffer distance. The negative X direction capped velocity limit determinations are similar, where capped velocity limits in the negative X direction are calculated at blocks 126*a* and 126*b*. Note that the output of block 126*b* will be negative or zero depending on whether the proximity values are outside or inside the buffer zone, and the output of block 126*a* may be negative, zero, or positive depending on whether the proximity values are outside, at, or inside the buffer zone.

The outputs of blocks 125*b* and 126*b*, which are the zero-bounded velocity limits, are provided to block 135, where they are implemented to limit the user control input 122. Depending on the sign of the user control input 122, either one of the positive velocity limit 125*b* or the negative velocity limit 126*b* is used at block 135 to limit the user input authority. The resulting velocity command based on the user control input 122 is outputted at block 136. In an embodiment where no autonomous control is implemented, only this zero-bounded portion of the control diagram may be implemented to deprive the user authority to move the marine vessel closer to the object O than is permitted.

In an embodiment where autonomous control is provided, the output of blocks 125*a* and 126*a* may be utilized to determine an autonomous velocity command. The outputs of blocks 125*a* and 125*b* or 126*a* and 126*b* are summed at blocks 127 and 128, respectively. If the buffer zone is not violated, then the outputs of the summed blocks will cancel each other out and the output of the summation blocks 127 and 128 will be zero. If the output of the summation block 127, 128 is non-zero, then the buffer zone has been violated and a propulsion command is calculated to move the marine vessel away from the object. The absolute value of the respective summed output is determined at blocks 129 and 130, and a negative gain is applied at blocks 131 and 132. Blocks 133 and 134 are provided to implement a user override, where the autonomous propulsion control to actively maintain the buffer distance is suspended when the user-generated instruction 121 is active, or positive, by setting the output of blocks 133 and 134 to zero. Assuming that the user-generated instruction 121 is not active, the output of block 133 or 134 (whichever is nonzero) is provided to block 137, which reapplies the relevant sign to generate a propulsion command in the correct direction. The resulting propulsion command is outputted at block 139.

Thus, in embodiments where the buffer distance is modified in response to the user-generated instruction 121, the control algorithm continues to operate the same. However, on the side where the buffer distance is changed, the modified buffer distance value 50' will be a negative number and will be additive to the proximity measurement $O_d$. Thereby, the calculated velocity limit 113 on the relevant side (e.g. the starboard side in the example of FIG. 5B) may be higher than the velocity limits in the other directions such that the marine vessel 10 will be allowed to approach and impact the object on the relevant side in response to user control inputs to move the marine vessel in the direction of the object. In other embodiments, the control system may operate differently in response to the user-generated instruction to suspend maintenance of the buffer distance 50. For example, the propulsion controller (e.g. CCM 24) may be configured to apply a preset velocity limit for operation within the buffer zone in response to the user-generated instruction. In such an embodiment, the preset velocity limit will be relatively low so as to provide a controlled approach and impact with the object $O_d$.

One such embodiment may be by scaling and/or offsetting the user control input via the user input device, such as the joystick 30. For instance, the user control input 122 from the joystick 30 may be multiplied by a percentage, such as 20%. Thereby, the imposed velocity limit would be 20% of the maximum velocity associated with the maximum joystick position. In certain embodiments, the rescaled output may only be applied in the direction of the object O, and user input commands in other directions (such as away from the object O) may be provided without such limitations.

Figure 8:
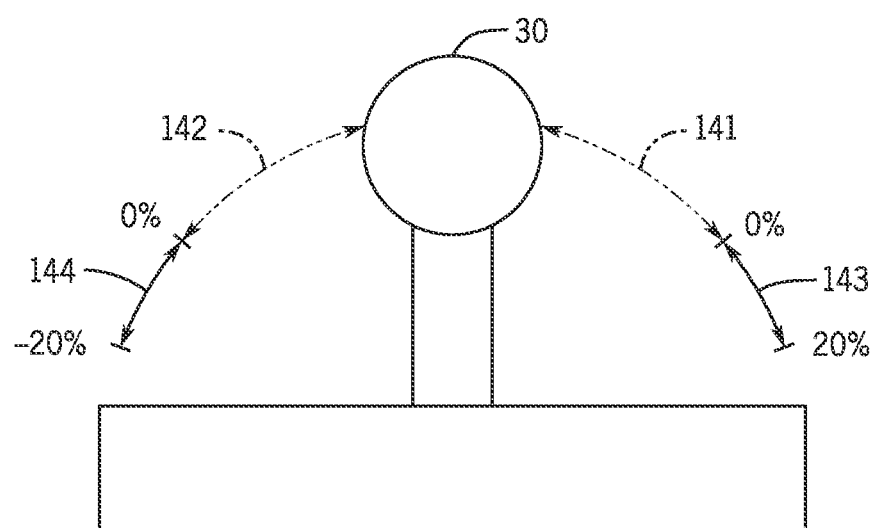
FIG. 8 illustrates an offset and rescale of a joystick user input device.

FIG. 8 schematically illustrates an offset and rescale of the joystick input. An offset is applied such that no propulsion output is generated for an inner portion 141, 142 of the joystick range. Thus, movement of the joystick 30 within that inner range 141, 142 will not result in production of any thrust output. The outer joystick range 143, 144 is then rescaled to provide a lesser velocity command than normally associated with those joystick positions. In the depicted embodiment, the inner range 141, 142 is 80% of the total joystick range, and the remaining 20% of the outer joystick range 143, 144 is rescaled to provide zero to 20% of the normal velocity command. Thus, only operation of the joystick in the outer range 143, 144 provides a corresponding velocity command, which will be significantly limited compared to the velocity commands normally associated with that outer range.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of controlling propulsion of a marine vessel, the method comprising:
    limiting user input authority over propulsion output by at least one propulsion device based on proximity measurements so as to maintain the marine vessel at least a buffer distance from any object, wherein the buffer distance is a predefined distance around the marine vessel that is less than or equal to 15 meters;

receiving a user-generated instruction to suspend maintenance of the buffer distance and a user control input to move the marine vessel in a direction of the object; and controlling the at least one propulsion device based on the user control input such that the marine vessel approaches and impacts the object.

2. The method of claim 1, further comprising, upon reaching a predetermined distance from the object, adjusting a display to provide a user input option to suspend maintenance of the buffer distance, wherein the predetermined distance is greater than or equal to the buffer distance.

3. The method of claim 1, further comprising controlling a user input device to present a user input option to select at least one of a port side, a starboard side, a rear side, or a front side of the marine vessel for suspending the maintenance of the buffer distance; and wherein the user-generated instruction specifies at least a selected one of the port side, the starboard side, the rear side, or the front side of the marine vessel for suspension of the buffer distance.

4. The method of claim 1, further comprising, after receiving the user-generated instruction to suspend maintenance of the buffer distance, generating an alert notifying a user that the buffer distance is no longer maintained.

5. The method of claim 1, further comprising, in response to the user-generated instruction, stop maintaining the buffer distance in at least one direction with respect to the marine vessel.

6. The method of claim 5, further comprising setting a modified buffer distance value on at least one side of the marine vessel that is less than the buffer distance and controlling the at least one propulsion device based on the user control input and the modified buffer distance value such that the marine vessel approaches and impacts the object.

7. The method of claim 6, wherein the modified buffer distance value is a negative number.

8. The method of claim 1, further comprising, in response to the user-generated instruction, stop maintaining the buffer distance only in the direction of the object and continue maintaining the buffer distance in all other directions around the marine vessel.

9. The method of claim 1, further comprising, in response to the user-generated instruction, stop maintaining the buffer distance only in a direction of a propulsion instruction by a user and continue maintaining the buffer distance in all other directions around the marine vessel.

10. The method of claim 1, wherein the user-generated instruction specifies a direction with respect to the marine vessel, and further comprising, in response to the user-generated instruction, stop maintaining the buffer distance only in the direction specified by the user-generated instruction and continue maintaining the buffer distance in all other directions around the marine vessel.

11. The method of claim 1, further comprising, in response to the user-generated instruction, stop maintaining the buffer distance in all directions around the marine vessel.

12. The method of claim 1, wherein controlling the at least one propulsion device based on the user control input such that the marine vessel approaches and impacts the object includes limiting user input authority over propulsion output in the direction of the object such that the marine vessel is automatically maintained at least the buffer distance away from the object until the user-generated instruction to suspend maintenance of the buffer distance is received.

13. The method of claim 1, wherein the user control input is received from a joystick, and further comprising rescaling the user control input from the joystick to limit the user input authority.

14. The method of claim 1, further comprising imposing a velocity limit in the direction of the object based on the proximity measurements so as to progressively decrease the velocity limit as the marine vessel approaches the object such that the velocity limit is zero in the direction of the object when the marine vessel is at the buffer distance from the object.

15. The method of claim 14, further comprising:

upon receiving the user-generated instruction to suspend the maintenance of the buffer distance, setting a modified buffer distance value on at least one side of the marine vessel, wherein the modified buffer distance value is zero or a negative number;

recalculating the velocity limit based on the modified buffer distance value; and controlling the at least one propulsion device based on the user control input and the recalculated velocity limit.

16. A propulsion control system for a marine vessel, the propulsion control system comprising:

at least one propulsion device configured to propel the marine vessel;

at least one input device manipulatable to provide user control input to control a movement direction and velocity of the marine vessel;

at least one proximity sensor configured to generate proximity measurements describing a proximity of objects with respect to the marine vessel;

a controller configured to:

limit user input authority over propulsion output by the at least one propulsion device based on the proximity measurements so as to maintain the marine vessel at least a buffer distance from any of the objects measured by the at least one proximity sensor, wherein the buffer distance is a predefined distance around the marine vessel that is less than or equal to 15 meters;

receive a user-generated instruction to suspend maintenance of the buffer distance and a user control input to move the marine vessel in a direction of a first object; and control the at least one propulsion device based on the user control input such that the marine vessel approaches and impacts the first object.

17. The system of claim 16, wherein the user-generated instruction specifies a direction with respect to the marine vessel, wherein the controller is further configured to stop maintaining the buffer distance only in the direction specified by the user-generated instruction and continue maintaining the buffer distance in all other directions around the marine vessel.

18. The system of claim 17, wherein the controller is further configured to present a user input option to select at least one of a port side, a starboard side, a rear side, or a front side of the marine vessel for suspending the maintenance of the buffer distance such that the user-generated instruction specifies at least a selected one of the port side, the starboard side, the rear side, or the front side of the marine vessel.

19. The system of claim 16, wherein the controller is further configured to, in response to receiving the user-generated instruction, stop maintaining the buffer distance in all directions around the marine vessel.

20. The system of claim 16, wherein the controller is further configured to, upon reaching a predetermined distance from the first object, adjust a display to provide a user input option to suspend maintenance of the buffer distance, wherein the predetermined distance is greater than or equal to the buffer distance.

21. The system of claim 20, wherein the controller is further configured to, in response to receiving the user-generated instruction, stop maintaining the buffer distance only in the direction of the first object and continue maintaining the buffer distance in all other directions around the marine vessel.

22. The system of claim 16, wherein the controller is further configured to:
   upon receiving the user-generated instruction to suspend the maintenance of the buffer distance, set a modified buffer distance value on at least one side of the marine vessel wherein the modified buffer distance value is zero or a negative number; and
   control the at least one propulsion device based on the user control input and the modified buffer distance value.

23. The system of claim 16, wherein the input device is a joystick, and wherein the controller is further configured to, upon receiving the user-generated instruction, rescale the user control input from the joystick to limit the user input authority in the direction of the first object.

\* \* \* \* \*